United States Patent
Yamamoto

(10) Patent No.: US 12,397,792 B2
(45) Date of Patent: Aug. 26, 2025

(54) VEHICLE DRIVING ASSIST APPARATUS, VEHICLE DRIVING ASSIST METHOD, AND VEHICLE DRIVING ASSIST PROGRAM

(71) Applicant: TOYOTA JIDOSHA KABUSHIKI KAISHA, Toyota (JP)

(72) Inventor: Takahiro Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 283 days.

(21) Appl. No.: 17/858,599

(22) Filed: Jul. 6, 2022

(65) Prior Publication Data

US 2023/0082526 A1 Mar. 16, 2023

(30) Foreign Application Priority Data

Sep. 14, 2021 (JP) ................. 2021-149230

(51) Int. Cl.
*B60W 30/18* (2012.01)
(52) U.S. Cl.
CPC ... *B60W 30/18109* (2013.01); *B60W 2510/18* (2013.01); *B60W 2552/15* (2020.02)
(58) Field of Classification Search
CPC ....... B60W 30/18109; B60W 2552/15; B60W 2510/18
USPC .......................................................... 701/10
See application file for complete search history.

(56) References Cited

U.S. PATENT DOCUMENTS

| | | | | |
|---|---|---|---|---|
| 10,829,098 B2 * | 11/2020 | Perlick | .................. | B60W 10/11 |
| 2003/0111902 A1 * | 6/2003 | Thiede | .................. | G08G 1/161 |
| | | | | 303/193 |
| 2005/0096183 A1 * | 5/2005 | Watanabe | ................. | B60T 7/12 |
| | | | | 477/182 |
| 2005/0187694 A1 * | 8/2005 | Shiiba | ............. | B60W 30/18109 |
| | | | | 701/91 |
| 2011/0276216 A1 * | 11/2011 | Vaughan | ............. | B60W 30/143 |
| | | | | 701/31.4 |
| 2012/0089313 A1 * | 4/2012 | Frashure | ............... | B60T 13/585 |
| | | | | 701/94 |

(Continued)

FOREIGN PATENT DOCUMENTS

| GB | 2319636 A | * | 5/1998 | ............. B60K 31/10 |
|---|---|---|---|---|
| JP | 2012-206699 A | | 10/2012 | |
| JP | 2018-031467 A | | 3/2018 | |

OTHER PUBLICATIONS

Fancher, The Influence of Braking Strategy on Brake Temperatures in Mountain Descents, Mar. 1992, Federal Highway Administration (Year: 1992).*

*Primary Examiner* — Matthias S Weisfeld
(74) *Attorney, Agent, or Firm* — Sughrue Mion, PLLC

(57) ABSTRACT

A vehicle driving assist apparatus executes a constant speed moving control to autonomously control a moving speed of an own vehicle to a set moving speed. The vehicle driving assist apparatus pauses the constant speed moving control and executes an intermittent braking control when the own vehicle moves down a slope having a gradient smaller than a predetermined gradient threshold while the constant speed moving control is executed. The intermittent braking control is a control to alternately apply and stop applying the braking force to the own vehicle. The braking force applied to the own vehicle by the intermittent braking control is greater than the braking force applied to the own vehicle by the constant speed moving control.

5 Claims, 10 Drawing Sheets

(56) References Cited

U.S. PATENT DOCUMENTS

| | | | | |
|---|---|---|---|---|
| 2014/0156163 | A1* | 6/2014 | Shin | B60W 10/184 |
| | | | | 701/94 |
| 2015/0367833 | A1* | 12/2015 | Maeda | B60W 20/11 |
| | | | | 903/917 |
| 2021/0179110 | A1* | 6/2021 | Arai | B60W 30/143 |
| 2022/0001865 | A1* | 1/2022 | Park | B60W 60/0023 |
| 2022/0097705 | A1* | 3/2022 | Hall | B60W 30/18109 |
| 2022/0144310 | A1* | 5/2022 | Hong | B60W 30/18072 |

\* cited by examiner

VEHICLE DRIVING ASSIST APPARATUS, VEHICLE DRIVING ASSIST METHOD, AND VEHICLE DRIVING ASSIST PROGRAM

CROSS-REFERENCE TO RELATED APPLICATIONS

This application claims priority to Japanese patent application No. JP 2021-149230 filed on Sep. 14, 2021, the content of which is hereby incorporated by reference in its entirety.

BACKGROUND

Field

The invention relates to a vehicle driving assist apparatus, a vehicle driving assist method, and a vehicle driving assist program.

Description of the Related Art

There is known a vehicle driving assist apparatus which executes a constant speed moving control to maintain a moving speed of an own vehicle at a set moving speed by autonomously controlling a driving force and a braking force applied to the own vehicle without a driver of the own vehicle operating an accelerator pedal and a brake pedal (for example, see JP 2018-31467 A).

The known vehicle driving assist described above may continue applying the braking force to the own vehicle to maintain the moving speed of the own vehicle at the set moving speed when the own vehicle moves down a slope. If the slope where the own vehicle move down is moderate, the known vehicle driving assist apparatus may continue applying the relatively small braking force to the own vehicle for a relatively long time.

If the small braking force has been applied to the own vehicle for a long time, there may occur a vibration such as a so-called self-excited vibration due to thermal expansion of brake pads and brake discs. Such a vibration may lead to a discomfort of the driver of the own vehicle.

SUMMARY

An object of the invention is to provide a vehicle driving assist apparatus, a vehicle driving assist method, and a vehicle driving assist program which can prevent an occurrence of the self-excited vibration due to the constant speed moving control.

According to the invention, a vehicle driving assist apparatus comprises an electronic control unit which executes a constant speed moving control to autonomously control a moving speed of an own vehicle to a set moving speed. The electronic control unit is configured to pause the constant speed moving control and execute an intermittent braking control when the own vehicle moves down a slope having a gradient smaller than a predetermined gradient threshold while the constant speed moving control is executed. The intermittent braking control is a control to alternately apply and stop applying the braking force to the own vehicle. The braking force applied to the own vehicle by the intermittent braking control is greater than the braking force applied to the own vehicle by the constant speed moving control.

As described above, when the own vehicle moves down the moderate slope while the constant speed moving control is executed, the relatively small braking force may have been applied to the own vehicle for a long time. When the small braking force has been applied for a long time, there may occur a vibration such as a so-called self-exited vibration due to thermal expansion of the brake pads and the brake discs. Such a vibration may lead to a discomfort of the driver of the own vehicle.

With the vehicle driving assist apparatus according to the invention, on the condition that the own vehicle moves down the slope having the gradient smaller than the predetermined gradient threshold while the constant speed moving control is executed, the intermittent barking control is executed. The braking force applied to the own vehicle by the intermittent braking control is greater than the braking force applied to the own vehicle by the constant speed moving control. Thus, the occurrence of the self-exited vibration can be prevented.

According to an aspect of the invention, the electronic control unit may be configured to determine that the own vehicle moves down the slope having the gradient smaller than the predetermined gradient threshold when the braking force applied to the own vehicle by the constant speed moving control has been smaller than a predetermined braking force threshold for a predetermined time.

With the vehicle driving assist apparatus according to this aspect of the invention, whether the own vehicle moves down the moderate slope can be determined, based on the braking force applied to the own vehicle.

According to another aspect of the invention, the electronic control unit may be configured to pause the intermittent braking control and start the constant speed moving control when the moving speed of the own vehicle becomes equal to or greater than a predetermined upper limit vehicle moving speed greater than the set moving speed, or becomes equal to or smaller than a predetermined lower limit vehicle moving speed smaller than the set moving speed while the intermittent braking control is executed.

When the intermittent braking control is stopped, and the constant speed moving control is started in response to the moving speed of the own vehicle considerably increasing while the intermittent braking control is executed, the relatively great braking force is applied to the own vehicle by the constant speed moving control. Thus, even if the constant speed moving control is started, the self-vibration may not occur. Thus, in order to meet a request of the driver to move the own vehicle at a constant speed, the intermittent braking control should be stopped, and the constant speed moving control should be started.

Further, when the intermittent braking control is stopped, and the constant speed moving control is started in response to the moving speed of the own vehicle considerably decreasing while the intermittent braking control is executed, the considerably small braking force is probably applied to the own vehicle by the constant speed moving control. Thus, even if the constant speed moving control is started, the self-vibration may not occur. Thus, in order to meet a request of the driver to move the own vehicle at a constant speed, the intermittent braking control should be stopped, and the constant speed moving control should be started.

With the vehicle driving assist apparatus according to this aspect of the invention, on the condition that the moving speed of the own vehicle considerably increases or decreases while the intermittent braking control is executed, the intermittent barking control is stopped, and the constant speed moving control is started. Thus, the request of the driver can be met.

Further, according to the invention, a vehicle comprises the vehicle driving assist apparatus according to the invention.

Furthermore, a vehicle driving assist method according to the invention is a method of executing a constant speed moving control to autonomously control a moving speed of an own vehicle to a set moving speed. The vehicle driving assist method according to the invention comprises a step to pause the constant speed moving control and execute an intermittent braking control when the own vehicle moves down a slope having a gradient smaller than a predetermined gradient threshold while the constant speed moving control is executed. The intermittent braking control is a control to alternately apply and stop applying the braking force to the own vehicle. The braking force applied to the own vehicle by the intermittent braking control is greater than the braking force applied to the own vehicle by the constant speed moving control.

A vehicle driving assist program according to the invention is a program of executing a constant speed moving control to autonomously control a moving speed of an own vehicle to a set moving speed. The vehicle driving assist program according to the invention is configured to pause the constant speed moving control and execute an intermittent braking control when the own vehicle moves down a slope having a gradient smaller than a predetermined gradient threshold while the constant speed moving control is executed. The intermittent braking control is a control to alternately apply and stop applying the braking force to the own vehicle. The braking force applied to the own vehicle by the intermittent braking control is greater than the braking force applied to the own vehicle by the constant speed moving control.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
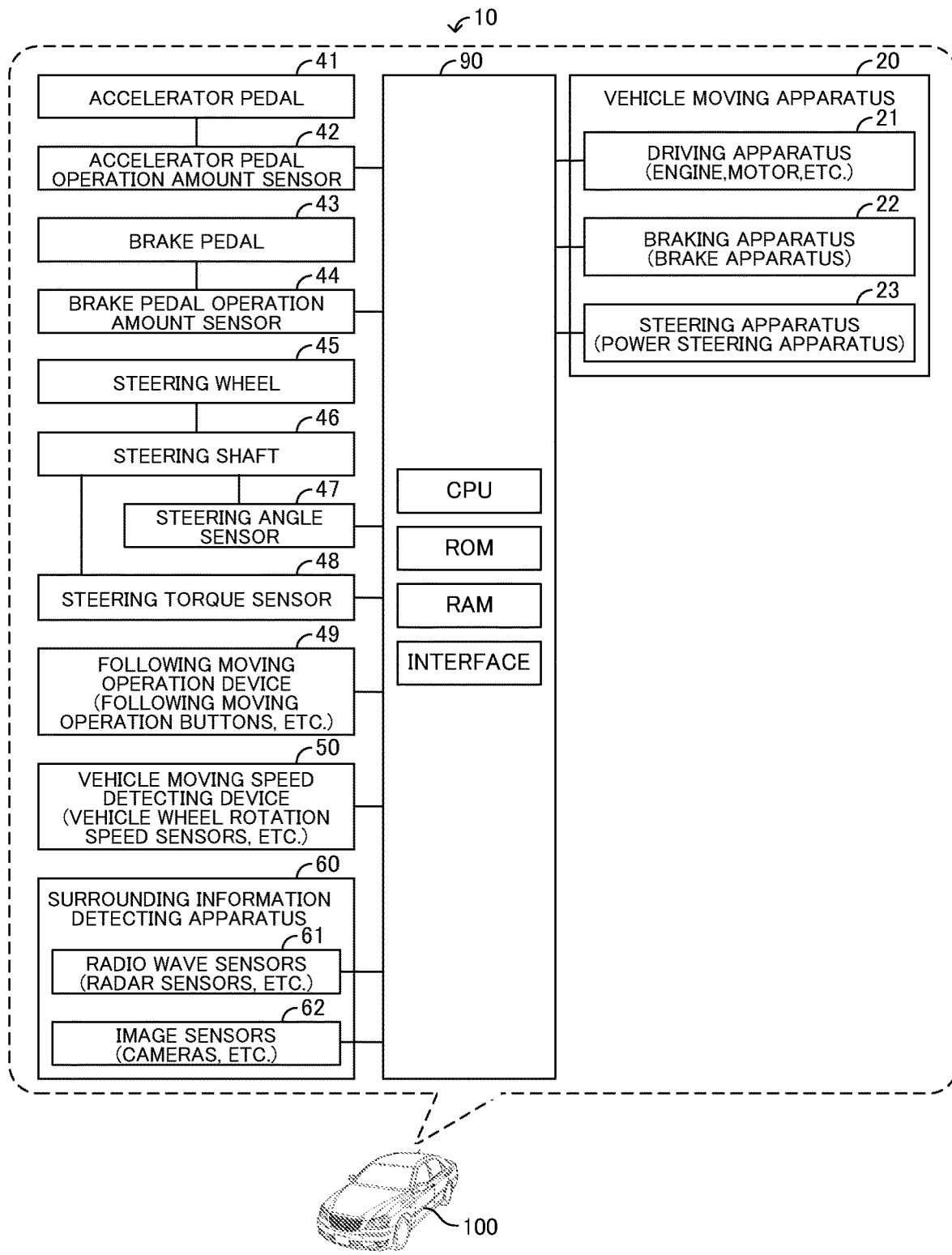
FIG. 1 is a view which shows a vehicle driving assist apparatus according to an embodiment of the invention and a vehicle or an own vehicle on which the vehicle driving assist apparatus is installed.

Below, a vehicle driving assist apparatus 10 according to an embodiment of the invention will be described with reference to the drawings. As shown in FIG. 1, the vehicle driving assist apparatus 10 is installed on an own vehicle 100.

The vehicle driving assist apparatus 10 includes an ECU 90 as a control unit. The ECU 90 includes a micro-computer as a main component. The ECU 90 includes a CPU, a ROM, a RAM, a non-volatile memory, and an interface. The CPU is configured or programmed to realize various functions by executing instructions, programs, and routines stored in the ROM.

<Vehicle Moving Apparatus>

Further, a vehicle moving apparatus 20 is installed on the own vehicle 100. The vehicle moving apparatus 20 drives, brakes, and steers the own vehicle 100. In this embodiment, the vehicle moving apparatus 20 includes a driving apparatus 21, a braking apparatus 22, and a steering apparatus 23.

<Driving Apparatus>

The driving apparatus 21 outputs a driving force to be applied to the own vehicle 100 to move the own vehicle 100. In this embodiment, the driving apparatus 21 includes an internal combustion engine. In this regard, the driving apparatus 21 may include at least one electric motor or a combination of the internal combustion engine and the at least one electric motor. The driving apparatus 21 is electrically connected to the ECU 90. The ECU 90 controls the driving force output from the driving apparatus 21 by controlling operations of the driving apparatus 21.

<Braking Apparatus>

The braking apparatus 22 outputs a braking force to be applied to the own vehicle 100 to brake the own vehicle 100. In this embodiment, the braking apparatus 22 includes a hydraulic brake apparatus which applies the braking force to the own vehicle 100 by pressing brake pads to brake discs provided on wheels of the own vehicle 100, respectively. The braking apparatus 22 is electrically connected to the ECU 90. The ECU 90 controls the braking force output from the braking apparatus 22 by controlling operations of the braking apparatus 22.

<Steering Apparatus>

The steering apparatus 23 outputs a steering force to be applied to the own vehicle 100 to steer the own vehicle 100. The steering apparatus 23 may include a power steering apparatus. The steering apparatus 23 is electrically connected to the ECU 90. The ECU 90 controls the steering force output from the steering apparatus 23 by controlling operations of the steering apparatus 23.

<Sensors, Etc.>

Further, an accelerator pedal 41, an accelerator pedal operation amount sensor 42, a brake pedal 43, a brake pedal operation amount sensor 44, a steering wheel 45, a steering shaft 46, a steering angle sensor 47, a steering torque sensor 48, a following moving operation device 49, a vehicle moving speed detecting device 50, and a surrounding information detecting apparatus 60 are installed on the own vehicle 100.

<Accelerator Pedal Operation Amount Sensor>

The accelerator pedal operation amount sensor 42 detects an operation amount of the accelerator pedal 41. The accelerator pedal operation amount sensor 42 is electrically connected to the ECU 90. The accelerator pedal operation amount sensor 42 sends information on the detected operation amount of the accelerator pedal 41 to the ECU 90. The ECU 90 acquires the operation amount of the accelerator pedal 41 as an accelerator pedal operation amount AP, based on the information sent from the accelerator pedal operation amount sensor 42.

The ECU 90 executes an ordinary accelerating-and-decelerating control to (i) calculate and acquire a required driving force or a required driving torque, based on the accelerator pedal operation amount AP and a moving speed of the own vehicle 100, i.e., an own vehicle moving speed and (ii) control the operations of the driving apparatus 21 so as to output the driving force corresponding to the required driving force. It should be noted that while the ECU 90 executes a following moving control, a constant speed moving control, or an intermittent braking control described later in detail, the ECU 90 determines the driving force necessary to move the own vehicle 100 so as to realize a target acceleration GA_TGT or a target deceleration GD_TGT set by the following moving control, the constant speed moving control, or the intermittent braking control and controls the operations of the driving apparatus 21 so as to output the driving force corresponding to the determined driving force.

<Brake Pedal Operation Amount Sensor>

The brake pedal operation amount sensor 44 detects an operation amount of the brake pedal 43. The brake pedal operation amount sensor 44 is electrically connected to the ECU 90. The brake pedal operation amount sensor 44 sends information on the detected operation amount of the brake pedal 43 to the ECU 90. The ECU 90 acquires the operation amount of the brake pedal 43 as a brake pedal operation amount BP, based on the information sent from the brake pedal operation amount sensor 44.

The ECU 90 executes the ordinary accelerating-and-decelerating control to (i) calculate and acquire a required braking force or a required braking torque, based on the brake pedal operation amount BP and (ii) control the operations of the braking apparatus 22 so as to output the braking force corresponding to the required braking force. It should be noted that while the ECU 90 executes the following moving control, the constant speed moving control, or the intermittent braking control described later in detail, the ECU 90 determines the braking force necessary to brake the own vehicle 100 so as to realize the target acceleration GA_TGT or the target deceleration GD_TGT set by the following moving control, the constant speed moving control, or the intermittent braking control and controls the operations of the braking apparatus 22 so as to output the braking force corresponding to the determined braking force.

<Steering Angle Sensor>

The steering angle sensor 47 detects a rotation angle of the steering shaft 46 with respect to a neutral position thereof. The steering angle sensor 47 is electrically connected to the ECU 90. The steering angle sensor 47 sends information on the detected rotation angle of the steering shaft 46 to the ECU 90. The ECU 90 acquires the rotation angle of the steering shaft 46 as a steering angle $\theta$, based on the information sent from the steering angle sensor 47.

<Steering Torque Sensor>

The steering torque sensor 48 detects a torque which a driver DV of the own vehicle 100 inputs to the steering shaft 46 via the steering wheel 45. The steering torque sensor 48 is electrically connected to the ECU 90. The steering torque sensor 48 sends information on the detected torque to the ECU 90. The ECU 90 acquires the torque which the driver DV inputs to the steering shaft 46 via the steering wheel 45 as a driver input torque, based on the information sent from the steering torque sensor 48.

The ECU 90 acquires a required steering force or a required steering torque, based on the steering angle $\theta$, the driver input torque, and the moving speed of the own vehicle 100, i.e., the own vehicle moving speed and controls the operations of the steering apparatus 23 so as to output the steering torque corresponding to the required steering torque.

<Following Moving Operation Device>

The following moving operation device 49 is operated by the driver DV of the own vehicle 100. The following moving operation device 49 includes switches and/or buttons. The switches and/or the buttons may be provided on the steering wheel 45 of the own vehicle 100 or a lever provided on a steering column of the own vehicle 100.

In this embodiment, the following moving operation device 49 includes a following moving selecting switch, a vehicle moving speed setting switch, a vehicle moving speed increasing button, a vehicle moving speed decreasing button, and an inter-vehicle distance setting button. The following moving operation device 49 is electrically connected to the ECU 90.

When a driving assist control including (i) the following moving control, (ii) the constant speed moving control, and (iii) the intermittent braking control described later in detail is not executed, and the following moving selecting switch is operated by the driver DV, a predetermined signal is sent to the ECU 90 from the following moving operation device 49. When the ECU 90 receives the predetermined signal in question, the ECU 90 determines that the driver DV requests executing the driving assist control. When the ECU 90 determines that the driver DV requests executing the driving assist control, and there is a preceding vehicle, the ECU 90 executes the following moving control. On the other hand, when the ECU 90 determines that the driver DV requests executing the driving assist control, and there is no preceding vehicle, the ECU 90 executes the constant speed moving control.

On the other hand, when the driving assist control is executed, and the following moving selecting switch is operated by the driver DV, a predetermined signal is sent to the ECU 90 from the following moving operation device 49. When the ECU 90 receives the predetermined signal in question, the ECU 90 determines that the driver DV requests terminating the driving assist control. When the ECU 90 determines that the driver DV requests terminating the driving assist control, the ECU 90 terminates the following moving control, the constant speed moving control, or the intermittent braking control. It should be noted that as described later, while the intermittent braking control is executed, the constant speed moving control has been paused. In this case, when the ECU 90 terminates the intermittent braking control, the ECU 90 terminates the paused constant speed moving control.

Further, when the driving assist control is executed, and the vehicle moving speed setting switch is operated by the driver DV, a predetermined signal is sent to the ECU 90 from the following moving operation device 49. When the ECU 90 receives the predetermined signal in question, the ECU 90 sets the current moving speed of the own vehicle 100, i.e., the current own vehicle moving speed as a set vehicle moving speed V_SET used in the constant speed moving control.

Further, when the driving assist control is executed, and the vehicle moving speed increasing button is operated by the driver DV, a predetermined signal is sent to the ECU 90 from the following moving operation device 49. When the ECU 90 receives the predetermined signal in question, the ECU 90 increases the set vehicle moving speed V_SET. On the other hand, when the driving assist control is executed, and the vehicle moving speed decreasing button is operated by the driver DV, a predetermined signal is sent to the ECU 90 from the following moving operation device 49. When the ECU 90 receives the predetermined signal in question, the ECU 90 decreases the set vehicle moving speed V_SET.

Further, when the driving assist control is executed, and the inter-vehicle distance setting button is operated by the driver DV, a predetermined signal is sent to the ECU 90 from the following moving operation device 49. The predetermined signal in question is a requested inter-vehicle distance signal which represents an inter-vehicle distance D requested as a target inter-vehicle distance D_TGT or a predetermined inter-vehicle distance by the driver DV operating the inter-vehicle distance setting button.

Figure 2A:
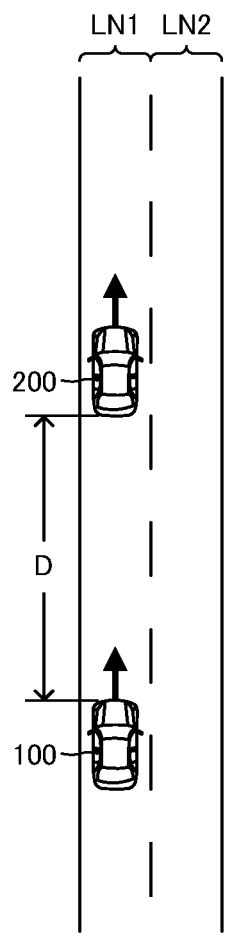
FIG. 2A is a view which shows a scene that the own vehicle is moved, following a preceding vehicle by a following moving control.

As shown in FIG. 2A, the inter-vehicle distance D is a distance between the preceding vehicle 200 and the own vehicle 100, and the target inter-vehicle distance D_TGT is the inter-vehicle distance D which the following moving control targets. In this embodiment, the preceding vehicle 200 is a vehicle which is within a predetermined distance range ahead of the own vehicle 100 and moves in a traffic lane in which the own vehicle 100 moves, i.e., moves in an own vehicle moving lane LN1. It should be noted that in the drawings, a symbol LN2 denotes a traffic lane next to the own vehicle moving lane LN1, and in this embodiment, denotes a traffic lane in which an oncoming vehicle moves.

In this embodiment, the inter-vehicle distance D which the driver DV can request as the target inter-vehicle distance D_TGT by operating the inter-vehicle distance setting button is one of three distances, i.e., a long distance, a middle distance, and a short distance.

When the ECU 90 receives the requested inter-vehicle distance signal, the ECU 90 sets the target inter-vehicle distance D_TGT, depending on the inter-vehicle distance D represented by the received requested inter-vehicle distance signal, i.e., depending on a requested inter-vehicle distance D_REQ.

In this embodiment, the ECU 90 sets the target inter-vehicle distance D_TGT, depending on the requested inter-vehicle distance D_REQ in consideration of the current own vehicle moving speed V100. In this regard, the ECU 90 may set the target inter-vehicle distance D_TGT, depending on the requested inter-vehicle distance D_REQ without considering the current own vehicle moving speed V100.

In particular, the ECU 90 sets as the target inter-vehicle distance D_TGT, the inter-vehicle distance D which makes a predicted reaching time TTC correspond to a predetermined time or a predetermined predicted reaching time TTC_REF. The predicted reaching time TTC is time acquired by dividing the inter-vehicle distance D by the current own vehicle moving speed V100. In other words, the ECU 90 sets as the target inter-vehicle distance D_TGT, the inter-vehicle distance D which makes a relationship between the current own vehicle moving speed V100 and the predetermined predicted reaching time TTC_REF correspond to a relationship of an expression 1 below.

$$TTC\_REF = D/V100 \quad (1)$$

When the requested inter-vehicle distance D_REQ is the long distance, the predetermined predicted reaching time TTC_REF is a long time TTClong. When the requested inter-vehicle distance D_REQ is the middle distance, the predetermined predicted reaching time TTC_REF is a middle time TTCmid. When the requested inter-vehicle distance D_REQ is the short distance, the predetermined predicted reaching time TTC_REF is a short time TTCshort.

<Vehicle Moving Speed Detecting Device>

The vehicle moving speed detecting device 50 detects the moving speed of the own vehicle 100. The vehicle moving speed detecting device 50 may include vehicle wheel rotation speed sensors. The vehicle moving speed detecting device 50 is electrically connected to the ECU 90. The vehicle moving speed detecting device 50 sends information on the detected moving speed of the own vehicle 100 to the ECU 90. The ECU 90 acquires the moving speed of the own vehicle 100 as the own vehicle moving speed V100, based on the information sent from the vehicle moving speed detecting device 50.

<Surrounding Information Detecting Apparatus>

The surrounding information detecting apparatus 60 includes radio wave sensors 61 and image sensors 62.

<Radio Wave Sensors>

The radio wave sensor 61 detects information on objects around the own vehicle 100 by using radio waves. The radio wave sensor 61 may be a radar sensor such as a millimeter wave radar, a sonic wave sensor such as an ultrasonic wave sensor such as a clearance sonar, or an optical sensor such as a laser radar such as a LiDAR. The radio wave sensors 61 are electrically connected to the ECU 90. The radio wave sensor 61 transmits radio waves and receives the radio waves reflected on objects, i.e., receives the reflected radio waves. The radio wave sensors 61 send information on the transmitted radio waves and the received reflected radio waves to the ECU 90. In other words, the radio wave sensors 61 detect objects around the own vehicle 100 and send information on the detected objects to the ECU 90. The ECU 90 acquires surrounding information IS on the objects around the own vehicle 100, based on the information such as radio wave information IR or radio wave data sent from the radio wave sensors 61. The objects detected by using the radio wave sensors 61 may include vehicles, walls, bicycles, and persons.

<Image Sensors>

The image sensor 62 takes images of a view around the own vehicle 100. The image sensor 62 may be a camera. The image sensors 62 are electrically connected to the ECU 90. The image sensor 62 takes images of a view around the own vehicle 100 and sends information on the taken images to the ECU 90. The ECU 90 acquires the surrounding information IS on a situation around the own vehicle 100, based on the information such as image information IC or image data sent from the image sensors 62.

<Summary of Operations of Vehicle Driving Assist Apparatus>

Next, operations of the vehicle driving assist apparatus 10 will be described. When the vehicle driving assist apparatus 10 determines that the driver DV requests executing the following moving control, the vehicle driving assist apparatus 10 executes the following moving control or the constant speed moving control as described below.

<Following Moving Control>

As shown in FIG. 2A, when there is the preceding vehicle 200, the vehicle driving assist apparatus 10 executes the following moving control. The following moving control is a control to maintain the distance between the own vehicle 100 and the preceding vehicle 200 at a predetermined distance by autonomously controlling the operations of the driving apparatus 21 and/or the braking apparatus 22. That is, the following moving control is a control to maintain the distance between the own vehicle 100 and the preceding vehicle 200 at the predetermined distance by controlling the operations of the driving apparatus 21 and/or the braking apparatus 22 even when the driver DV does not operate the accelerator pedal 41 or the brake pedal 43. It should be noted that the vehicle driving assist apparatus 10 determines whether there is the preceding vehicle 200, based on the surrounding information IS.

When the vehicle driving assist apparatus 10 starts the following moving control, the vehicle driving assist apparatus 10 acquires a difference between the inter-vehicle distance D and the target inter-vehicle distance D_TGT as an inter-vehicle distance difference dD and maintains the inter-vehicle distance D at the target inter-vehicle distance D_TGT by a feedback control such as a PID control to control the operations of the driving apparatus 21 and/or the braking apparatus 22 so as to control the inter-vehicle distance difference dD to zero.

Figure 2B:
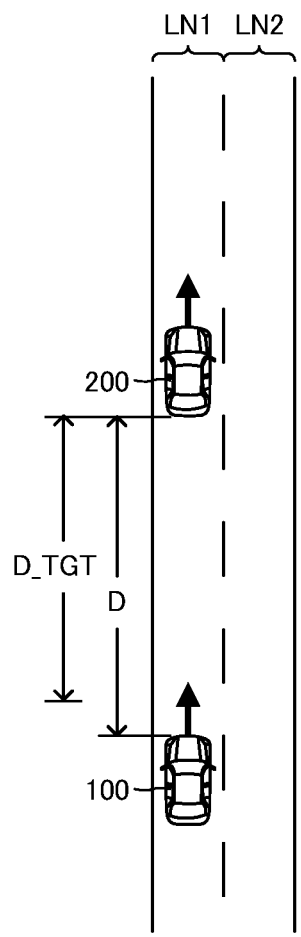
FIG. 2B is a view which shows a scene that an inter-vehicle distance is longer than a target inter-vehicle distance.

In particular, as shown in FIG. 2B, when the inter-vehicle distance D is greater than the target inter-vehicle distance D_TGT, the vehicle driving assist apparatus 10 calculates the target acceleration GA_TGT for decreasing the inter-vehicle distance D and controls the operations of the driving apparatus 21 so as to realize the calculated target acceleration GA_TGT. Thereby, the own vehicle moving speed V100 is increased and as a result, the inter-vehicle distance D is decreased toward the target inter-vehicle distance D_TGT.

Figure 2C:
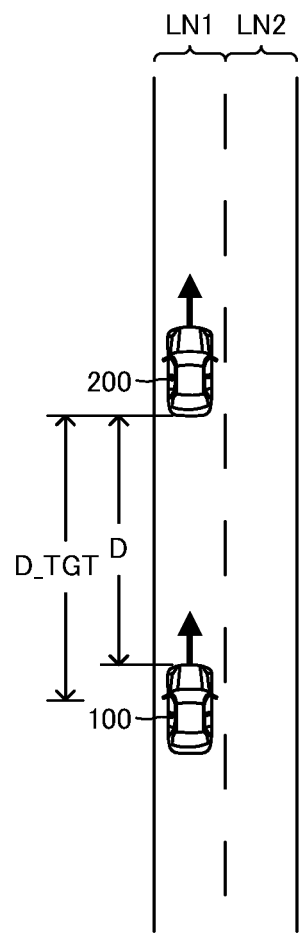
FIG. 2C is a view which shows a scene that the inter-vehicle distance is shorter than a target inter-vehicle distance.

On the other hand, as shown in FIG. 2C, when the inter-vehicle distance D is smaller than the target inter-vehicle distance D_TGT, the vehicle driving assist apparatus 10 calculates the target deceleration GD_TGT for increasing the inter-vehicle distance D and controls the operations of the braking apparatus 22 and/or the driving apparatus 21 so as to realize the calculated target deceleration GD_TGT. Thereby, the own vehicle moving speed V100 is decreased and as a result, the inter-vehicle distance D is increased toward the target inter-vehicle distance D_TGT.

It should be noted that if the target inter-vehicle distance D_TGT is equal to or smaller than zero, the own vehicle 100 contacts the preceding vehicle 200. Thus, in this embodiment, the target inter-vehicle distance D_TGT is set to a value greater than zero and enough to decelerate the own vehicle 100 so as not to contact the preceding vehicle 200 if the preceding vehicle 200 decelerates suddenly.

<Constant Speed Moving Control>

Figure 3:
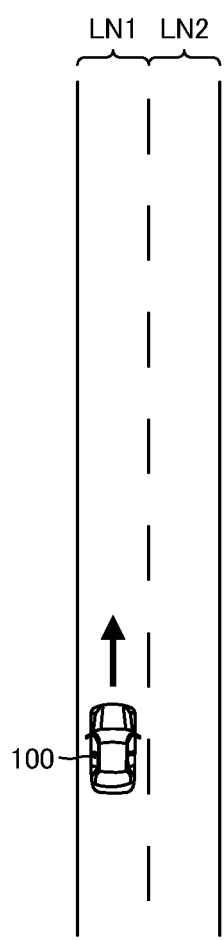
FIG. 3 is a view which shows a scene that there is no preceding vehicle.

As shown in FIG. 3, when there is no preceding vehicle 200, the vehicle driving assist apparatus 10 executes the constant speed moving control. The constant speed moving control is a control to maintain the own vehicle moving speed V100 at the set vehicle moving speed V_SET by autonomously controlling the operations of the driving apparatus 21 and/or the braking apparatus 22. In other words, the constant speed moving control is a control to maintain the own vehicle moving speed V100 at the set vehicle moving speed V_SET by controlling the operations of the driving apparatus 21 and/or the braking apparatus 22 even when the driver DV does not operate the accelerator pedal 41 or the brake pedal 43.

When the vehicle driving assist apparatus 10 starts the constant speed moving control, the vehicle driving assist apparatus 10 acquires a difference between the own vehicle moving speed V100 and the set vehicle moving speed V_SET as a vehicle moving speed difference dV and maintains the own vehicle moving speed V100 at the set vehicle moving speed V_SET by a feedback control such as a PID control to control the operations of the driving apparatus 21 and/or the braking apparatus 22 so as to control the vehicle moving speed difference dV to zero.

In particular, when the own vehicle moving speed V100 is greater than the set vehicle moving speed V_SET, the vehicle driving assist apparatus 10 calculates the target deceleration GD_TGT for decreasing the own vehicle moving speed V100 and controls the operations of the braking apparatus 22 and/or the driving apparatus 21 so as to realize the calculated target deceleration GD_TGT. Thereby, the own vehicle moving speed V100 is decreased toward the set vehicle moving speed V_SET.

On the other hand, when the own vehicle moving speed V100 is smaller than the set vehicle moving speed V_SET, the vehicle driving assist apparatus 10 calculates the target acceleration GA_TGT for increasing the own vehicle moving speed V100 and controls the operations of the driving apparatus 21 so as to realize the calculated target acceleration GA_TGT. Thereby, the own vehicle moving speed V100 is increased toward the set vehicle moving speed V_SET.

When the own vehicle 100 moves down a slope or a downward slope while the constant speed moving control is executed, the vehicle driving assist apparatus 10 continues applying the barking force to the own vehicle 100 in order to maintain the own vehicle moving speed V100 at the set vehicle moving speed V_SET. If the slope where the own vehicle 100 moves down is moderate, that is, if the own vehicle 100 moves down the slope having a small gradient, the vehicle driving assist apparatus 10 continues applying the relatively small braking force to the own vehicle 100 for a relatively long time.

If the small braking force has been applied to the own vehicle 100 for a long time, a vibration such as a so-called self-exited vibration may occur due to thermal expansion of the brake pads and the brake discs. Such a vibration may lead to a discomfort of the driver DV of the own vehicle 100.

Accordingly, when the own vehicle 100 moves down the slope or the downward slope having a gradient smaller than a predetermined gradient threshold while the constant speed moving control is executed, the vehicle driving assist apparatus 10 pauses the constant speed moving control and executes the intermittent braking control. In particular, when an intermittent braking control start condition is satisfied, the vehicle driving assist apparatus 10 pauses the constant speed moving control and starts the intermittent braking control. The intermittent braking control start condition is a condition that the own vehicle 100 moves down the slope having a gradient smaller than the predetermined gradient threshold while the constant speed moving control is executed.

In particular, in this embodiment, the vehicle driving assist apparatus 10 applies the braking force to the own vehicle 100 while the constant speed moving control is executed. In this regard, when the braking force has been smaller than a predetermined value or a predetermined braking force threshold BK_TH for a predetermined time T_TH, the vehicle driving assist apparatus 10 determines that the own vehicle 100 moves down the slope having a gradient smaller than the predetermined gradient threshold while the constant speed moving control is executed, and pauses the constant speed moving control and executes the intermittent braking control. In other words, when there is satisfied a condition that the braking force has been smaller than the predetermined braking force threshold BK_TH for the predetermined time T_TH while the constant speed moving control is executed, the vehicle driving assist apparatus 10 determines that the intermittent braking control start condition is satisfied and pauses the constant speed moving control and starts the intermittent braking control.

In this embodiment, the predetermined braking force threshold BK_TH is set to a lower limit of the braking force which does not produce the self-excited vibration in the braking apparatus 22.

<Intermittent Braking Control>

Figure 4:
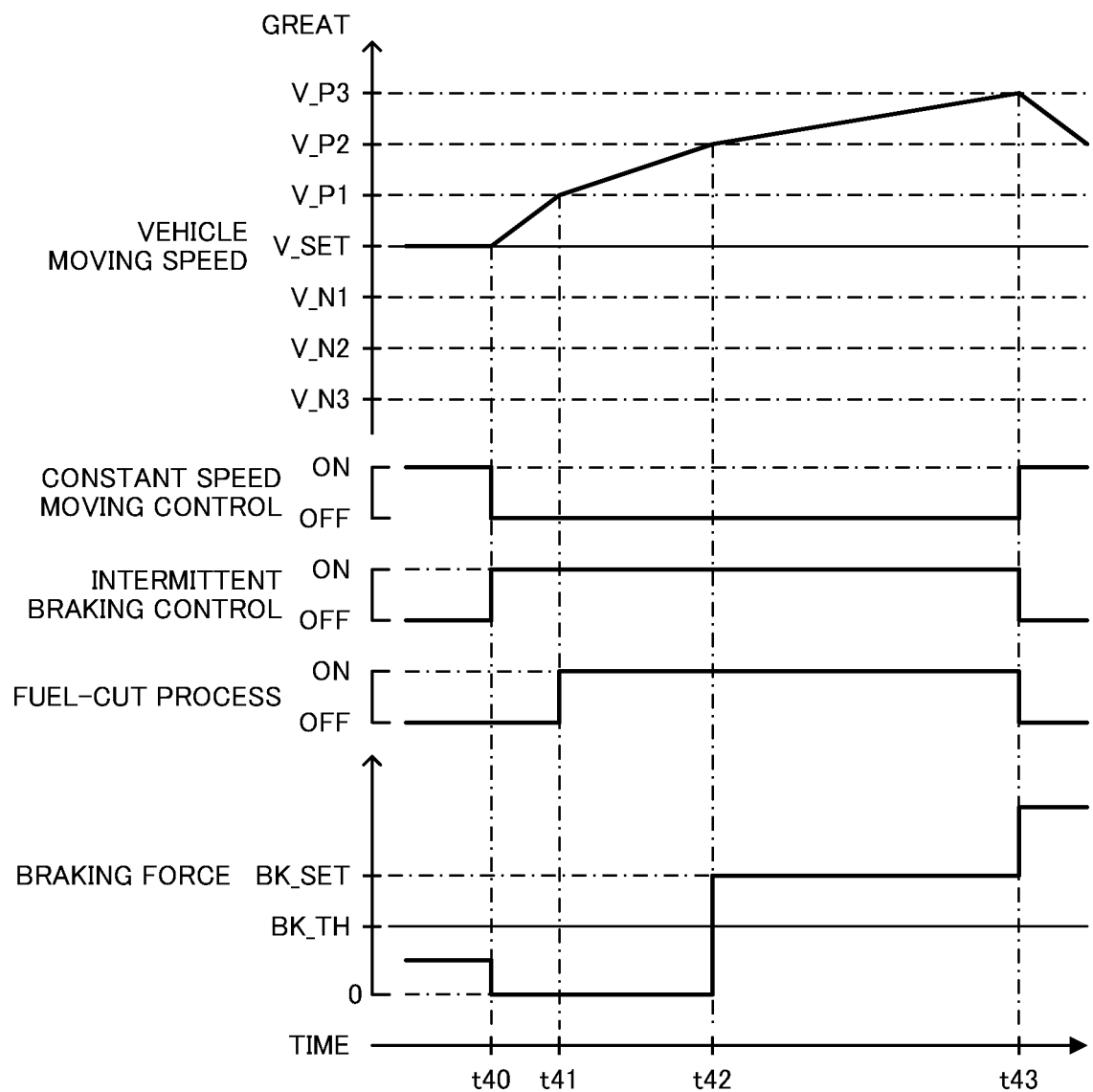
FIG. 4 is a view which shows a time chart when an intermittent braking control is executed as a vehicle moving speed increases.

As shown in FIG. 4, when the braking force has been smaller than the predetermined braking force threshold BK_TH for the predetermined time T_TH while the constant speed moving control is executed, and the vehicle driving assist apparatus 10 starts the intermittent braking control (see a time t40), the vehicle driving assist apparatus 10 controls the braking force applied to the own vehicle 100 or a vehicle applied braking force to zero once.

Then, as shown in FIG. 4, when the own vehicle moving speed V100 increases to a fuel-cut process start vehicle moving speed threshold V_P1 (see a time t41) while the intermittent braking control is executed, the vehicle driving assist apparatus 10 starts a fuel-cut process. In other words, when there is satisfied a fuel-cut process start condition that the own vehicle moving speed V100 increases to the fuel-cut process start vehicle moving speed threshold V_P1 while the intermittent braking control is executed, the vehicle driving assist apparatus 10 starts the fuel-cut process. The fuel-cut process start vehicle moving speed threshold V_P1 is set to a value greater than the set vehicle moving speed V_SET by a predetermined value or a first addition value dV_P1.

It should be noted that the fuel-cut process is a process to stop injecting fuel from fuel injectors of the internal combustion engine as the driving apparatus 21. Thus, when the fuel-cut process is executed, a so-called engine brake is applied to the own vehicle 100 and as a result, the own vehicle 100 is decelerated. Further, when the accelerator pedal operation amount AP is zero, the vehicle driving assist apparatus 10 causes the fuel injectors to inject the fuel having an amount necessary to operate the internal combustion engine. In this case, the engine brake is also applied to the own vehicle 100, but the deceleration of the own vehicle 100 is smaller than the deceleration of the own vehicle 100 realized by the fuel-cut process. It should be noted that when the braking force is applied to the own vehicle 100, the vehicle driving assist apparatus 10 also causes the fuel injectors to inject the fuel having an amount necessary to operate the internal combustion engine.

Further, as show in FIG. 4, when the own vehicle moving speed V100 increases to an intermittent braking process start vehicle moving speed threshold V_P2 (see a time t42) while the intermittent braking control is executed, the vehicle driving assist apparatus 10 starts an intermittent braking process to apply a predetermined braking force or a predetermined intermittent braking force BK_SET. In other words, when there is satisfied an intermittent braking process start condition that the own vehicle moving speed V100 increases to the intermittent braking process start vehicle moving speed threshold V_P2 while the intermittent braking control is executed, the vehicle driving assist apparatus 10 starts the intermittent braking process. The predetermined intermittent braking force BK_SET is set to the braking force equal to or greater than the predetermined braking force threshold BK_TH. Further, the intermittent braking process start vehicle moving speed threshold V_P2 is set to a value greater than the set vehicle moving speed V_SET by a predetermined value or a second addition value dV_P2. Furthermore, the second addition value dV_P2 is set to a value greater than the first addition value dV_P1. It should be noted that at this time, the vehicle driving assist apparatus 10 continues the fuel-cut process.

Further, as shown in FIG. 4, when the own vehicle moving speed V100 increases to a speed increasing control stop vehicle moving speed threshold V_P3 or a predetermined upper limit vehicle moving speed (see a time t43) while the intermittent braking control is executed, the vehicle driving assist apparatus 10 stops the intermittent braking control and starts the constant speed moving control. In other words, when there is satisfied a control stop condition that the own vehicle moving speed V100 increases to the speed increasing control stop vehicle moving speed threshold V_P3 while the intermittent braking control is executed, the vehicle driving assist apparatus 10 stops the intermittent braking control and starts the constant speed moving control. The speed increasing control stop vehicle moving speed threshold V_P3 is set to a value greater than the set vehicle moving speed V_SET by a predetermined value or a third addition value dV_P3. The third addition value dV_P3 is set to a value greater than the second addition value dV_P2. It should be noted that at this time, the intermittent braking control is stopped and thus, the fuel-cut process and the intermittent braking process are stopped.

Figure 5:
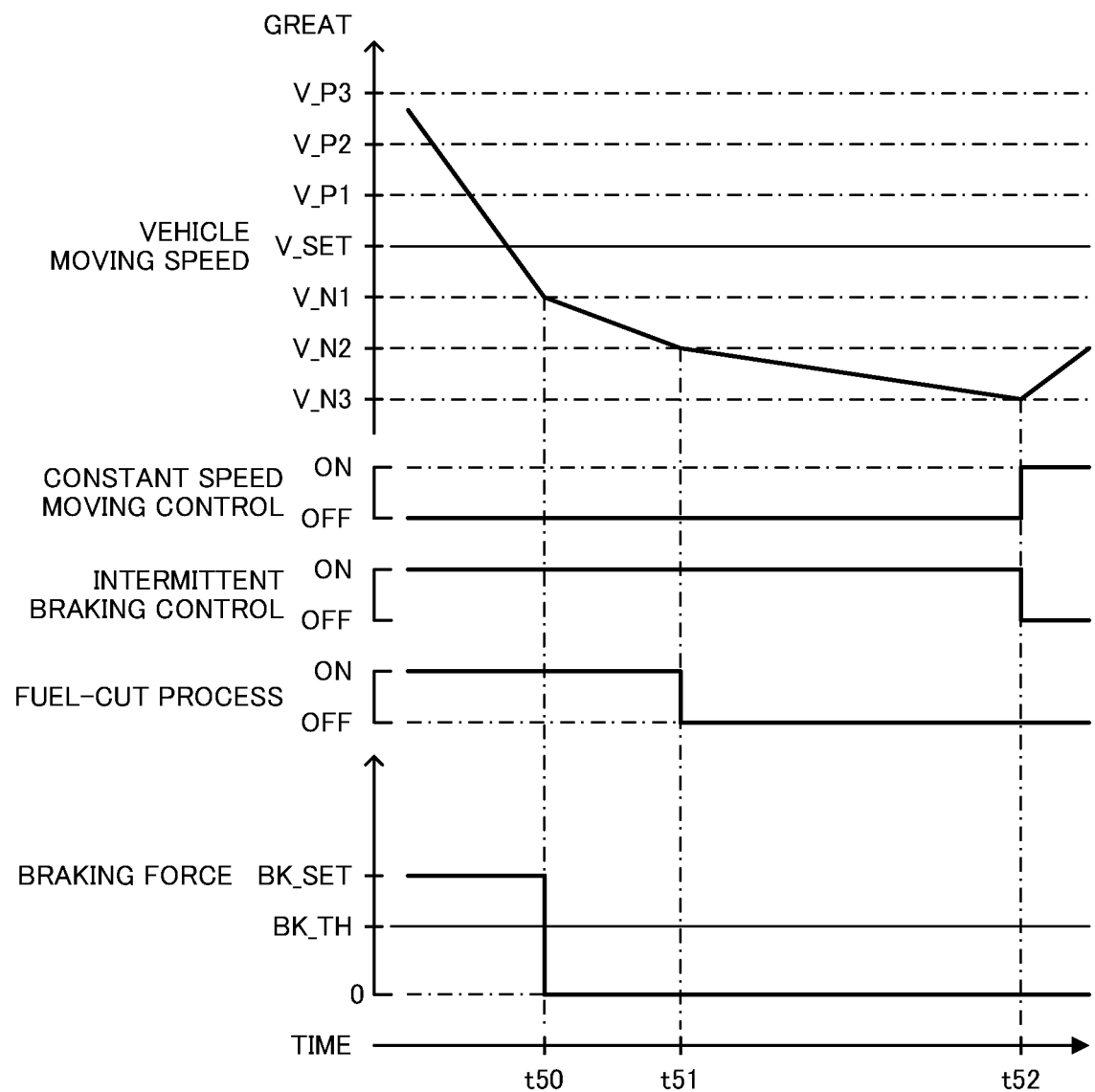
FIG. 5 is a view which shows a time chart when the intermittent braking control is executed as the vehicle moving speed decreases.

On the other hand, as shown in FIG. 5, when the own vehicle moving speed V100 decreases to an intermittent braking process stop vehicle moving speed threshold V_N1 (see a time t50) while the intermittent braking control is executed, the vehicle driving assist apparatus 10 stops the intermittent braking process. In other words, when there is satisfied an intermittent braking process stop condition that the own vehicle moving speed V100 decreases to the intermittent braking process stop vehicle moving speed threshold V_N1 while the intermittent braking control is executed, the vehicle driving assist apparatus 10 stops the intermittent braking process. The intermittent braking process stop vehicle moving speed threshold V_N1 is set to a value smaller than the set vehicle moving speed V_SET by a predetermined value or a first subtraction value dV_N1. It should be noted that at this time, the vehicle driving assist apparatus 10 does not stop the fuel-cut process.

Further, as shown in FIG. 5, when the own vehicle moving speed V100 decreases to a fuel-cut process stop vehicle moving speed threshold V_N2 (see a time t51) while the intermittent braking control is executed, the vehicle driving assist apparatus 10 stops the fuel-cut process. The fuel-cut process stop vehicle moving speed threshold V_N2 is set to a value smaller than the set vehicle moving speed V_SET by a predetermined value or a second subtraction value dV_N2. The second subtraction value dV_N2 is a set to a value greater than the first subtraction value dV_N1.

Further, as shown in FIG. 5, when the own vehicle moving speed V100 decreases to a speed decreasing control stop vehicle moving speed threshold V_N3 (see a time t52) while the intermittent braking control is executed, the vehicle driving assist apparatus 10 stops the intermittent braking control and starts the constant speed moving control. In other words, when there is satisfied the control stop condition that the own vehicle moving speed V100 decreases to the speed decreasing control stop vehicle moving speed threshold V_N3 while the intermittent braking control is executed, the vehicle driving assist apparatus 10 stops the intermittent braking control and starts the constant speed moving control. The speed decreasing control stop vehicle moving speed threshold V_N3 is set to a value smaller than the set vehicle moving speed V_SET by a predetermined value or a third subtraction value dV_N3. The third subtraction value dV_N3 is set to a value greater than the second subtraction value dV_N2.

Figure 6:
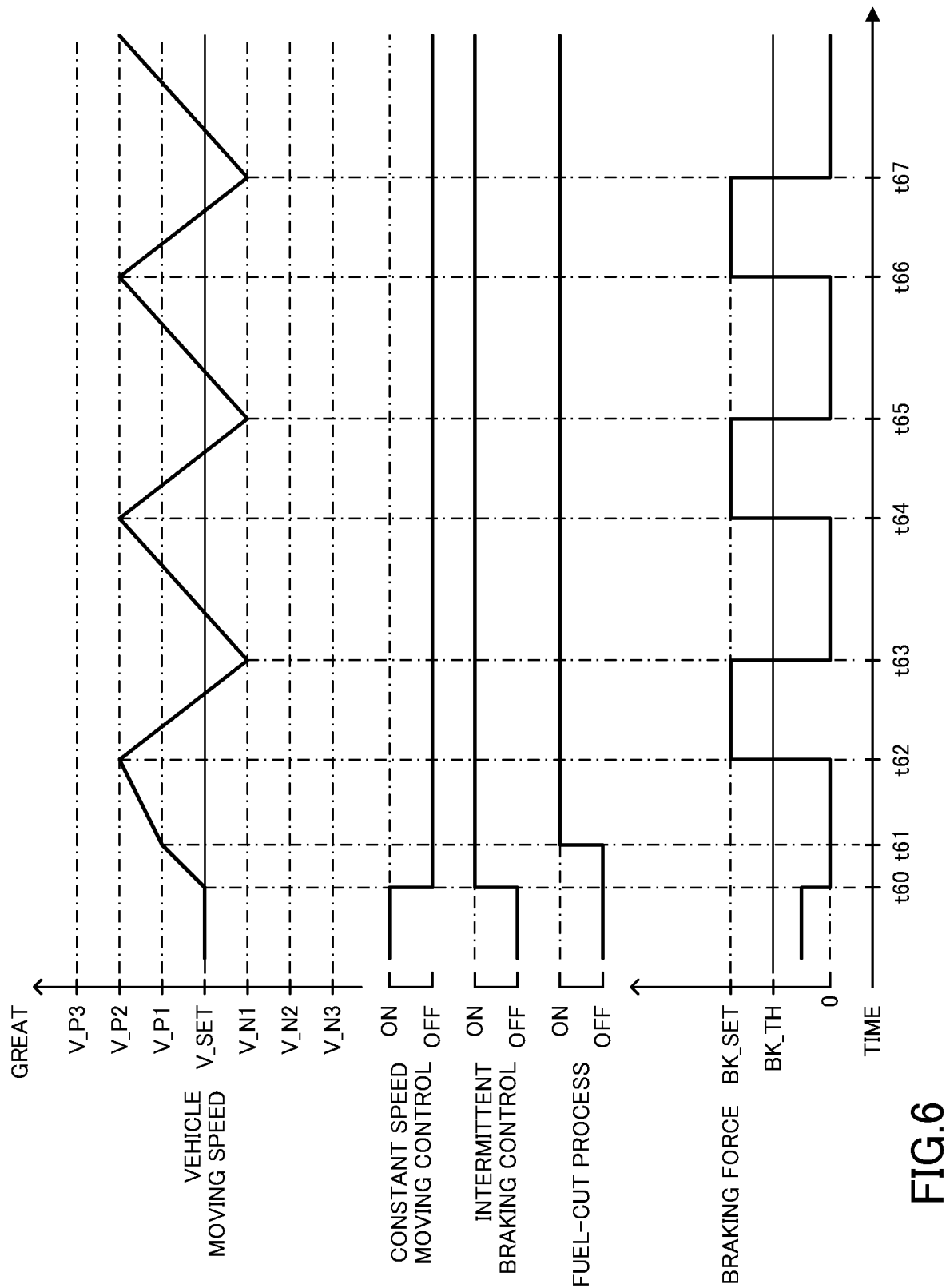
FIG. 6 is a view which shows a time chart when the intermittent braking control is executed.

When the vehicle driving assist apparatus 10 is configured to execute the intermittent braking control as described above, and the own vehicle 100 moves down the moderate slope, the braking force applied to the own vehicle 100 (i.e., the vehicle applied braking force) is controlled as shown in FIG. 6.

When the vehicle applied braking force has been smaller than the predetermined braking force threshold BK_TH for the predetermined time T_TH (see a time t60) while the constant speed moving control is executed, the constant speed moving control is paused, and the intermittent braking control is started. When the intermittent braking control is started, the vehicle applied braking force is controlled to zero. Thus, the own vehicle moving speed V100 starts to increase.

Thereafter, when the own vehicle moving speed V100 increases to the fuel-cut process start vehicle moving speed threshold V_P1 (see a time t61), the fuel-cut process is started. Thereafter, when the own vehicle moving speed V100 increases to the intermittent braking process start vehicle moving speed threshold V_P2 (see a time t62), the intermittent braking process is started. In this case, the braking force corresponding to the predetermined intermittent braking force BK_SET greater than the predetermined braking force threshold BK_TH is applied to the own vehicle 100. Thereby, in an example shown in FIG. 6, the own vehicle moving speed V100 starts to decrease.

When the own vehicle moving speed V100 decreases to the intermittent braking process stop vehicle moving speed threshold V_N1 (see a time t63), the intermittent braking process is stopped. Thereby, in the example shown in FIG. 6, the own vehicle moving speed V100 starts to increase. Thereafter, when the own vehicle moving speed V100 increases to the intermittent braking process start vehicle moving speed threshold V_P2 (see a time t64), the intermittent braking process is started. Thereby, in the example shown in FIG. 6, the own vehicle moving speed V100 starts to decrease. Thereafter, when the own vehicle moving speed V100 decreases to the intermittent braking process stop vehicle moving speed threshold V_N1 (see a time t65), the intermittent braking process is stopped. Thereby, in the example shown in FIG. 6, the own vehicle moving speed V100 starts to increase. Thereafter, when the own vehicle moving speed V100 increases to the intermittent braking process start vehicle moving speed threshold V_P2 (see a time t66), the intermittent braking process is started. Thereby, in the example shown in FIG. 6, the own vehicle moving speed V100 starts to decrease. Thereafter, when the own vehicle moving speed V100 decreases to the intermittent braking process stop vehicle moving speed threshold V_N1 (see a time t67), the intermittent braking process is stopped.

<Advantages>

As described above, when the own vehicle 100 moves down the moderate slope while the constant speed moving control is executed, the relatively small braking force may continue being applied to the own vehicle 100 for a relatively long time. If the small braking force continues being applied to the own vehicle 100 for a long time, the vibration such as a so-called self-exited vibration may occur due to thermal expansion of the brake pads and the brake discs. Such a vibration may lead to a discomfort of the driver DV of the own vehicle 100.

With the vehicle driving assist apparatus 10, when the braking force has been smaller than the predetermined braking force threshold BK_TH for the predetermined time T_TH while the constant speed moving control is executed, the intermittent control is executed. The braking force applied to the own vehicle 100 by the intermittent braking control is greater than the predetermined braking force threshold BK_TH. Thus, an occurrence of the self-excited vibration can be prevented.

It should be noted that with the vehicle driving assist apparatus 10, as described with reference to the example shown in FIG. 6, applying and stopping applying the braking force to the own vehicle 100 are alternately carried out while the intermittent braking control is executed. Thus, the own vehicle moving speed V100 can be maintained near the set vehicle moving speed V_SET while the intermittent braking control is executed.

<Specific Operations of Vehicle Driving Assist Apparatus>

Next, specific operations of the vehicle driving assist apparatus 10 will be described. The CPU of the ECU 90 of the vehicle driving assist apparatus 10 is configured or programmed to execute a routine shown in FIG. 7 with a predetermined calculation cycle. Thus, at a predetermined time, the CPU starts a process from a step 700 of the routine shown in FIG. 7 and proceeds with the process to a step 705 to determine whether the driving assist control is requested to be executed.

When the CPU determines "Yes" at the step 705, the CPU proceeds with the process to a step 710 to determine whether there is a preceding vehicle 200.

Figure 8:
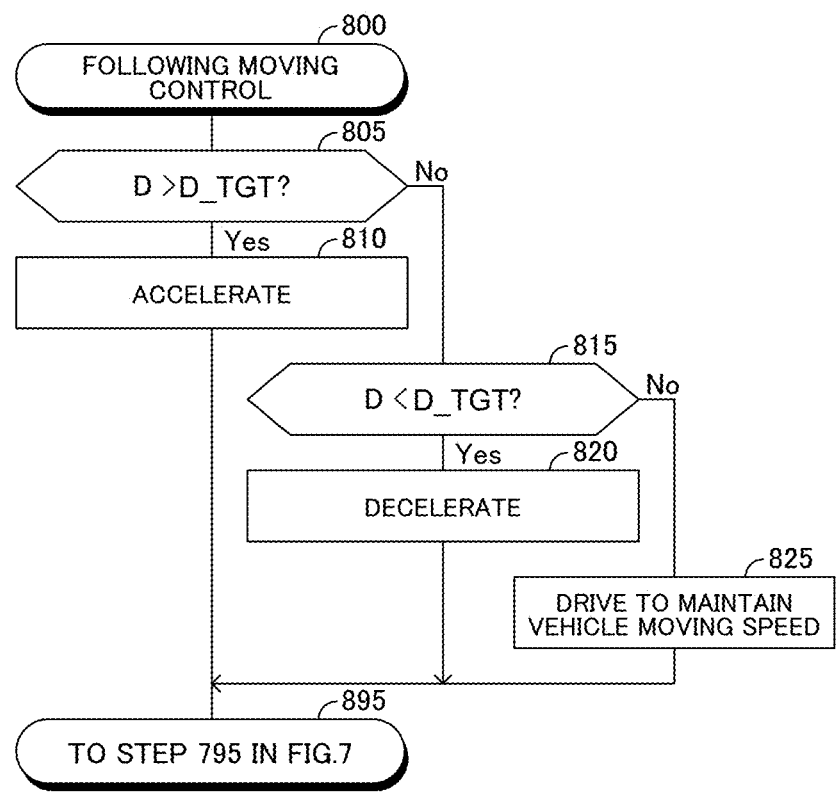
FIG. 8 is a view which shows a flowchart of a routine executed by the vehicle driving assist apparatus according to the embodiment of the invention.

When the CPU determines "Yes" at the step 710, the CPU proceeds with the process to a step 715 to execute a routine shown in FIG. 8. Thus, when the CPU proceeds with the process to the step 715, the CPU starts a process from a step 800 of the routine shown in FIG. 8 and proceeds with the process to a step 805 to determine whether the inter-vehicle distance D is greater than the target inter-vehicle distance D_TGT.

When the CPU determines "Yes" at the step 805, the CPU proceeds with the process to a step 810 to calculate the acceleration for controlling the inter-vehicle distance D to the target inter-vehicle distance D_TGT as the target acceleration GA_TGT, calculate the driving force to be applied to the own vehicle 100 in order to realize the acceleration corresponding to the target acceleration GA_TGT as a target driving force DR_TGT, and control the operations of the driving apparatus 21 so as to apply the driving force corresponding to the target driving force DR_TGT from the driving apparatus 21 to the own vehicle 100. Next, the CPU proceeds with the process to a step 795 of the routine shown in FIG. 7 via a step 895 to terminate executing this routine once.

On the other hand, when the CPU determines "No" at the step 805, the CPU proceeds with the process to a step 815 to determine whether the inter-vehicle distance D is smaller than the target inter-vehicle distance D_TGT.

When the CPU determines "Yes" at the step 815, the CPU proceeds with the process to a step 820 to calculate the deceleration for controlling the inter-vehicle distance D to the target inter-vehicle distance D_TGT as the target deceleration GD_TGT, calculate the braking force to be applied to the own vehicle 100 in order to realize the deceleration corresponding to the target deceleration GD_TGT as a target braking force BK_TGT, and control the operations of the braking apparatus 22 and/or the driving apparatus 21 so as to apply the braking force corresponding to the target braking force BK_TGT from the braking apparatus 22 and/or the driving apparatus 21 to the own vehicle 100. Next, the CPU proceeds with the process to the step 795 of the routine shown in FIG. 7 via the step 895 to terminate executing this routine once.

On the other hand, when the CPU determines "No" at the step 815, the CPU proceeds with the process to a step 825 to calculate the driving force necessary to maintain the current own vehicle moving speed V100 as the target driving force DR_TGT and control the operations of the driving apparatus 21 so as to apply the driving force corresponding to the target driving force DR_TGT from the driving apparatus 21 to the own vehicle 100. Next, the CPU proceeds with the process to the step 795 of the routine shown in FIG. 7 via the step 895 to terminate executing this routine once.

Figure 7:
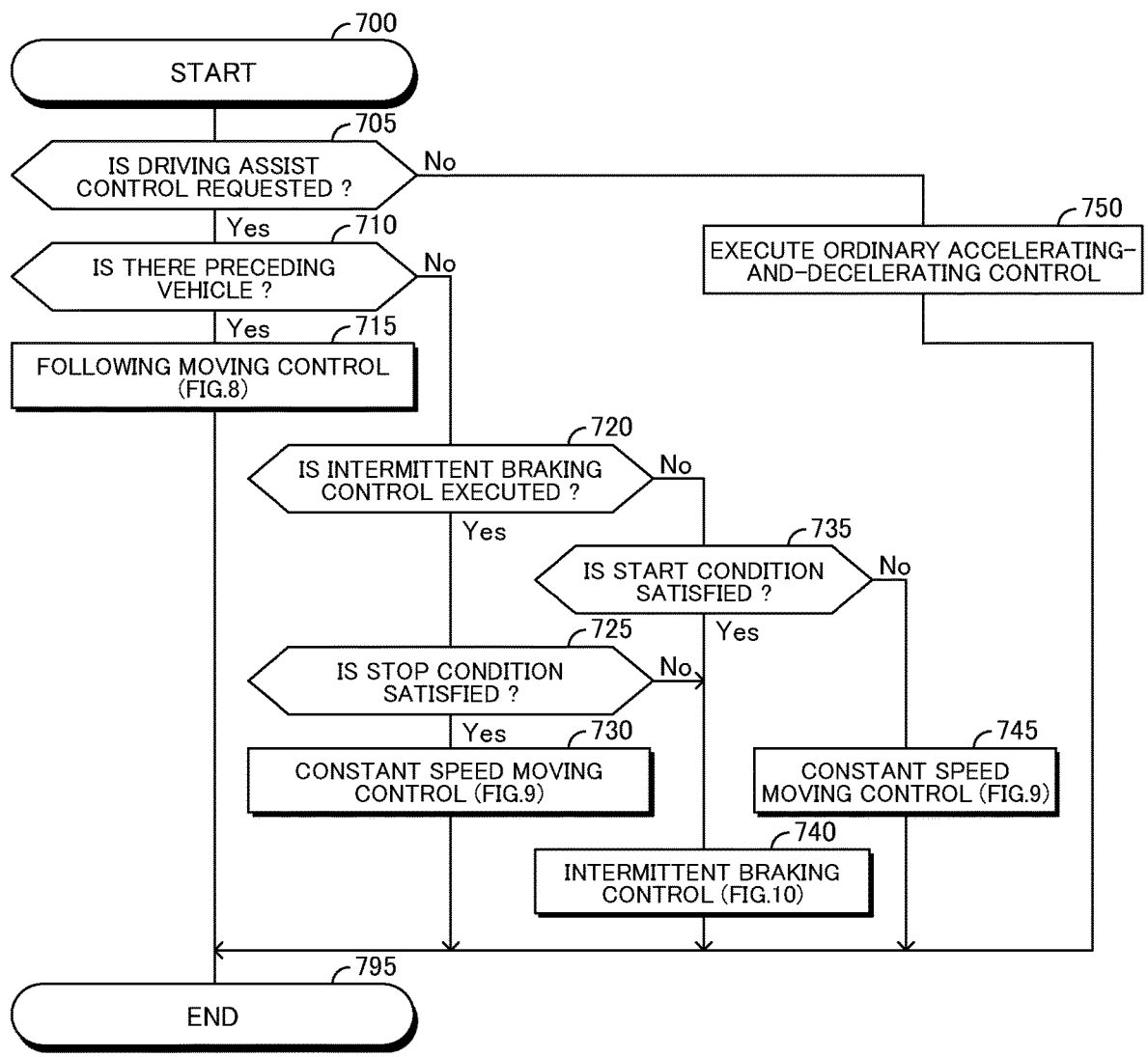
FIG. 7 is a view which shows a flowchart of a routine executed by the vehicle driving assist apparatus according to the embodiment of the invention.

Further, when the CPU determines "No" at the step 710 of the routine shown in FIG. 7, the CPU proceeds with the process to a step 720 to determine whether the intermittent braking control is executed.

When the CPU determines "Yes" at the step 720, the CPU proceeds with the process to a step 725 to determine whether the intermittent braking process stop condition is satisfied.

Figure 9:
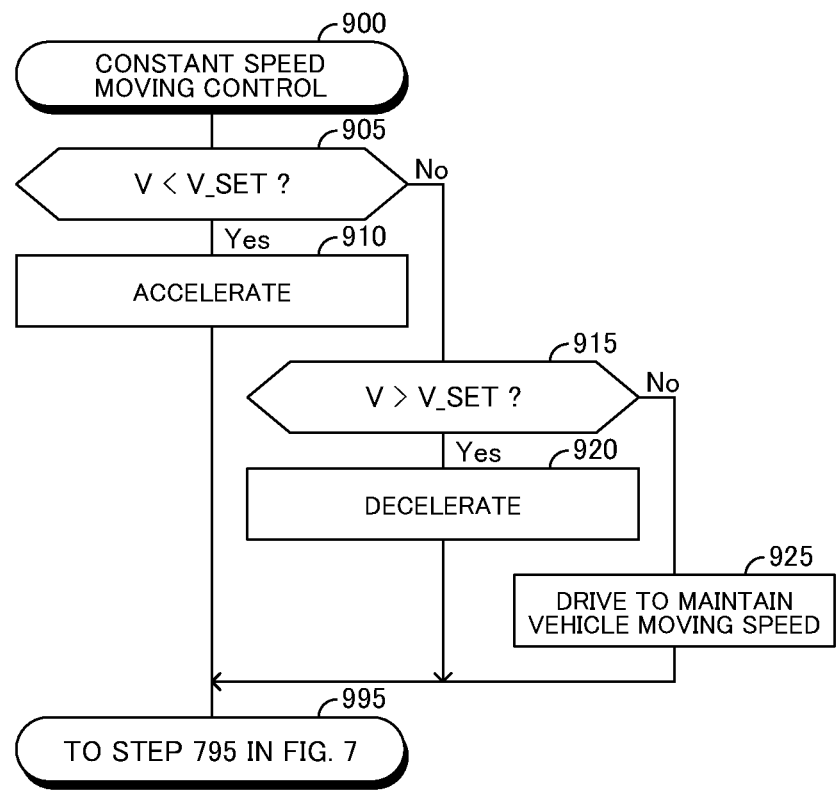
FIG. 9 is a view which shows a flowchart of a routine executed by the vehicle driving assist apparatus according to the embodiment of the invention.

When the CPU determines "Yes" at the step 725, the CPU proceeds with the process to a step 730 to execute a routine shown in FIG. 9. Thus, when the CPU proceeds with the process to the step 730, the CPU starts a process from a step 900 of the routine shown in FIG. 9 and proceeds with the process to a step 905 to determine whether the own vehicle moving speed V100 is smaller than the set vehicle moving speed V_SET.

When the CPU determines "Yes" at the step 905, the CPU proceeds with the process to a step 910 to calculate the acceleration for controlling the own vehicle moving speed V100 to the set vehicle moving speed V_SET as the target acceleration GA_TGT, calculate the driving force to be applied to the own vehicle 100 in order to realize the acceleration corresponding to the target acceleration GA_TGT as the target driving force DR_TGT, and control the operations of the driving apparatus 21 so as to apply the driving force corresponding to the target driving force DR_TGT from the driving apparatus 21 to the own vehicle 100. Next, the CPU proceeds with the process to the step 795 of the routine shown in FIG. 7 via a step 995 to terminate executing this routine once.

On the other hand, when the CPU determines "No" at the step 905, the CPU proceeds with the process to a step 915 to determine whether the own vehicle moving speed V100 is greater than the set vehicle moving speed V_SET.

When the CPU determines "Yes" at the step 915, the CPU proceeds with the process to a step 920 to calculate the deceleration for controlling the own vehicle moving speed V100 to the set vehicle moving speed V_SET as the target deceleration GD_TGT, calculate the braking force to be applied to the own vehicle 100 in order to realize the deceleration corresponding to the target deceleration GD_TGT as the target braking force BK_TGT, and control the operations of the braking apparatus 22 and/or the driving apparatus 21 so as to apply the braking force corresponding to the target braking force BK_TGT from the braking apparatus 22 and/or the driving apparatus 21 to the own vehicle 100. Next, the CPU proceeds with the process to the step 795 of the routine shown in FIG. 7 via the step 995 to terminate executing this routine once.

On the other hand, when the CPU determines "No" at the step 915, the CPU proceeds with the process to a step 925 to calculate the driving force necessary to maintain the current own vehicle moving speed V100 as the target driving force DR_TGT and control the operations of the driving apparatus 21 so as to apply the driving force corresponding to the target driving force DR_TGT from the driving apparatus 21 to the own vehicle 100. Next, the CPU proceeds with the process to the step 795 of the routine shown in FIG. 7 via the step 995 to terminate executing this routine once.

Figure 10:
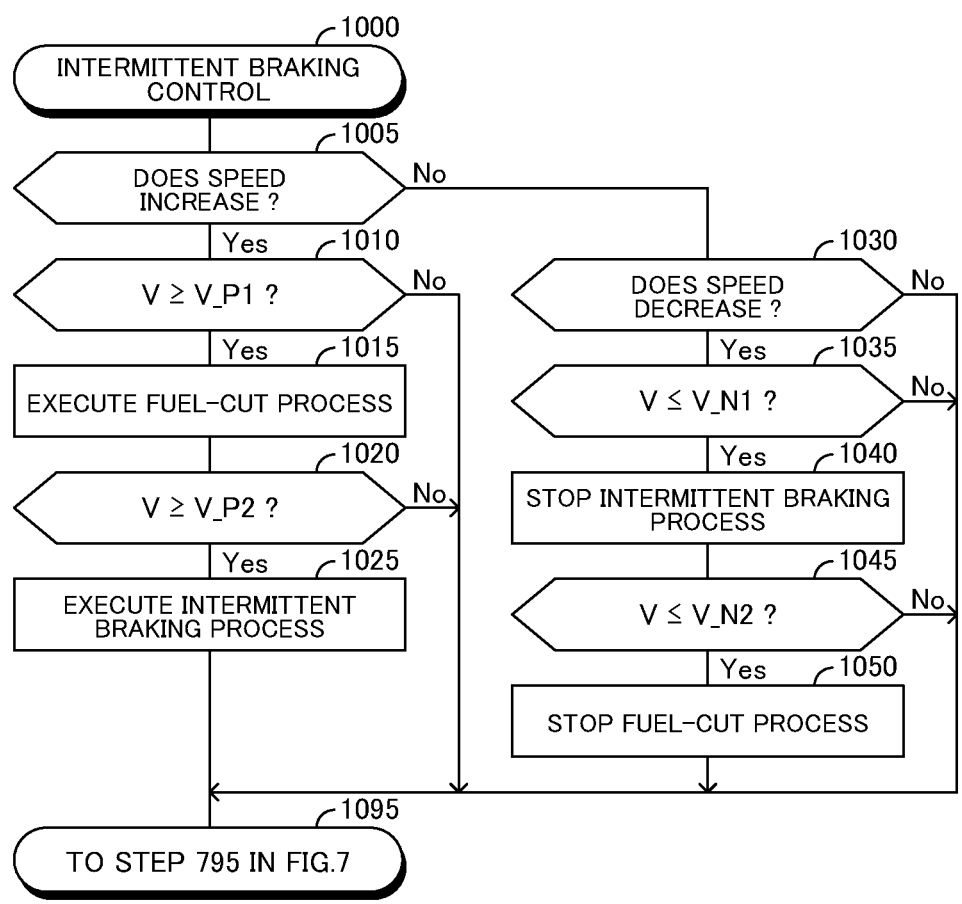
FIG. 10 is a view which shows a flowchart of a routine executed by the vehicle driving assist apparatus according to the embodiment of the invention.

Further, when the CPU determines "No" at the step 725 of the routine shown in FIG. 7, the CPU proceeds with the process to a step 740 to execute a routine shown in FIG. 10. Thus, when the CPU proceeds with the process to the step 740, the CPU starts a process from a step 1000 of the routine shown in FIG. 10 and proceeds with the process to a step 1005 to determine whether the own vehicle moving speed V100 increases.

When the CPU determines "Yes" at the step 1005, the CPU proceeds with the process to a step 1010 to determine whether the own vehicle moving speed V100 is equal to or greater than the fuel-cut process start vehicle moving speed threshold V_P1.

When the CPU determines "Yes" at the step 1010, the CPU proceeds with the process to a step 1015 to execute the fuel-cut process. Next, the CPU proceeds with the process to a step 1020 to determine whether the own vehicle moving speed V100 is equal to or greater than the intermittent braking process start vehicle moving speed threshold V_P2.

When the CPU determines "Yes" at the step 1020, the CPU proceeds with the process to a step 1025 to execute the intermittent braking process. That is, the braking force corresponding to the predetermined intermittent braking force BK_SET is applied to the own vehicle 100. Next, the CPU proceeds with the process to the step 795 of the routine shown in FIG. 7 via a step 1095 to terminate executing this routine once.

On the other hand, when the CPU determines "No" at the step 1010 or 1020, the CPU proceeds with the process directly to the step 795 of the routine shown in FIG. 7 via the step 1095 to terminate executing this routine once.

Further, when the CPU determines "No" at the step 1005, the CPU proceeds with the process to a step 1030 to determine whether the own vehicle moving speed V100 decreases.

When the CPU determines "Yes" at the step 1030, the CPU proceeds with the process to a step 1035 to determine whether the own vehicle moving speed V100 is equal to or smaller than the intermittent braking process stop vehicle moving speed threshold V_N1.

When the CPU determines "Yes" at the step 1030, the CPU proceeds with the process to a step 1040 to stop the intermittent braking process. Next, the CPU proceeds with the process to a step 1045 to determine whether the own vehicle moving speed V100 is equal to or smaller than the fuel-cut process stop vehicle moving speed threshold V_N2.

When the CPU determines "Yes" at the step 1045, the CPU proceeds with the process to a step 1050 to stop the fuel-cut process. Next, the CPU proceeds with the process to the step 795 of the routine shown in FIG. 7 via the step 1095 to terminate executing this routine once.

On the other hand, when the CPU determines "No" at the step 1035 or 1045, the CPU proceeds with the process directly to the step 795 of the routine shown in FIG. 7 via the step 1095 to terminate executing this routine once.

Further, when the CPU determines "No" at the step 720 of the routine shown in FIG. 7, the CPU proceeds with the process to a step 735 to determine whether the intermittent braking control start condition is satisfied.

Further, when the CPU determines "Yes" at the step 735, the CPU proceeds with the process to the step 740 to execute the routine shown in FIG. 10 as described above and then, proceeds with the process to the step 795 to terminate executing this routine once.

On the other hand, when the CPU determines "No" at the step 735, the CPU proceeds with the process to the step 745 to execute the routine shown in FIG. 9 as described above and then, proceeds with the process to the step 795 to terminate executing this routine once.

Further, when the CPU determines "No" at the step 705, the CPU proceeds with the process to a step 750 to execute the ordinary accelerating-and-decelerating control.

The specific operations of the vehicle driving assist apparatus 10 have been described.

It should be noted that the invention is not limited to the aforementioned embodiments, and various modifications can be employed within the scope of the invention.

What is claimed is:

1. A vehicle driving assist apparatus comprising an electronic control unit which executes a constant speed moving control to autonomously control a moving speed of an own vehicle to a set moving speed,
   wherein the electronic control unit is configured to:
      while the constant speed moving control is being executed, determine whether the own vehicle moves down a slope having a gradient smaller than a predetermined gradient threshold when a braking force applied to the own vehicle by the constant speed moving control has been smaller than a predetermined braking force threshold for a predetermined time;
      based upon the determination that the own vehicle moves down the slope having the gradient smaller than the predetermined gradient threshold while the constant speed moving control is executed even when the moving speed of the own vehicle is maintained to the set moving speed, pause the constant speed moving control and start an intermittent braking control; and
      based upon the determination that the own vehicle does not move down the slope having the gradient smaller than the predetermined gradient threshold while the constant speed moving control is executed, continue the constant speed moving control,
   wherein the intermittent braking control is a control to alternately apply and stop applying a braking force to the own vehicle by:
      applying the braking force when the moving speed of the own vehicle increases to an upper threshold greater than the set moving speed while stopping applying the braking force to the own vehicle; and
      stopping applying the braking force when the moving speed of the own vehicle decreases to a lower threshold smaller than the set moving speed while applying the braking force to the own vehicle, and
   wherein the braking force applied to the own vehicle by the intermittent braking control is greater than the braking force applied to the own vehicle by the constant speed moving control.

2. A vehicle comprising the vehicle driving assist apparatus as set forth in claim 1.

3. The vehicle driving assist apparatus as set forth in claim 1, wherein the electronic control unit is configured to pause the intermittent braking control and start the constant speed moving control when the moving speed of the own vehicle becomes equal to or greater than a predetermined upper limit vehicle moving speed greater than the upper threshold, or becomes equal to or smaller than a predetermined lower limit vehicle moving speed smaller than the lower threshold while the intermittent braking control is executed.

4. A non-transitory computer readable medium comprising a vehicle driving assist program that, when executed by a processor, performs a constant speed moving control to autonomously control a moving speed of an own vehicle to a set moving speed,
   wherein the vehicle driving assist program is configured to:
      while the constant speed moving control is being executed, determine whether the own vehicle moves down a slope having a gradient smaller than a predetermined gradient threshold when a braking force applied to the own vehicle by the constant speed moving control has been smaller than a predetermined braking force threshold for a predetermined time;
      based upon the determination that the own vehicle moves down the slope having the gradient smaller than the predetermined gradient threshold while the constant speed moving control is executed even when the moving speed of the own vehicle is maintained to the set moving speed, pause the constant speed moving control and start an intermittent braking control; and
      based upon the determination that the own vehicle does not move down the slope having the gradient smaller than the predetermined gradient threshold while the constant speed moving control is executed, continue the constant speed moving control,
   wherein the intermittent braking control is a control to alternately apply and stop applying a braking force to the own vehicle by:
      applying the braking force when the moving speed of the own vehicle increases to an upper threshold greater than the set moving speed while stopping applying the braking force to the own vehicle; and
      stopping applying the braking force when the moving speed of the own vehicle decreases to a lower threshold smaller than the set moving speed while applying the braking force to the own vehicle, and
   wherein the braking force applied to the own vehicle by the intermittent braking control is greater than the braking force applied to the own vehicle by the constant speed moving control.

5. A vehicle driving assist method of executing a constant speed moving control to autonomously control a moving speed of an own vehicle to a set moving speed,
   wherein the vehicle driving assist method comprises steps of:
      while the constant speed moving control is being executed, determining whether the own vehicle moves down a slope having a gradient smaller than a predetermined gradient threshold when a braking force applied to the own vehicle by the constant speed moving control has been smaller than a predetermined braking force threshold for a predetermined time;
      based upon the determination that the own vehicle moves down the slope having the gradient smaller than the predetermined gradient threshold while the constant speed moving control is executed even when the moving speed of the own vehicle is maintained to the set moving speed, pausing the constant speed moving control and starting an intermittent braking control; and based upon the determination that the own vehicle does not move down the slope having the gradient smaller than the predetermined gradient threshold while the constant speed moving control is executed, continuing the constant speed moving control, wherein the intermittent braking control is a control to alternately apply and stop applying a braking force to the own vehicle by:

applying the braking force when the moving speed of the own vehicle increases to an upper threshold greater than the set moving speed while stopping applying the braking force to the own vehicle; and stopping applying the braking force when the moving speed of the own vehicle decreases to a lower threshold smaller than the set moving speed while applying the braking force to the own vehicle, and wherein the braking force applied to the own vehicle by the intermittent braking control is greater than the braking force applied to the own vehicle by the constant speed moving control.

* * * * *